April 2, 1968          E. C. LETTER          3,376,089

HIGH SPEED OPTICAL SHUTTER

Filed April 25, 1966

EUGENE C. LETTER
INVENTOR.

BY *Lowell G. Wise*

ATTORNEY

United States Patent Office 3,376,089
Patented Apr. 2, 1968

3,376,089
HIGH SPEED OPTICAL SHUTTER
Eugene C. Letter, Penfield, N.Y., assignor to Bausch & Lomb Incorporated, Rochester, N.Y., a corporation of New York
Continuation-in-part of application Ser. No. 159,105, Dec. 13, 1961. This application Apr. 25, 1966, Ser. No. 544,929
The portion of the term of the patent subsequent to Dec. 27, 1983, has been dedicated to the Public
6 Claims. (Cl. 350—160)

This application is a continuation-in-part of my co-pending application Ser. No. 159,105 filed Dec. 13, 1961, now abandoned.

This invention relates to a high speed optical shutter or light valve and more particularly to an electrically controlled shutter or valve.

Studies of combustion, corona discharge, explosions, plastic and elastic deformation and shock wave phenomena frequently called for detailed photographs taken at shutter speeds of a few microseconds. Ballistics dynamic testing and chemical reactions also require pictures taken at similar speeds.

At relatively high speeds, it is desirable to shutter a relatively large aperture. The relatively large aperture is desirable since it allows adequate light to enter the optical shutter during the relatively short time intervals.

A high speed optical shutter according to the present invention may be opened or closed in less than 25 microseconds. In some cases the opening or closing speed approaches one microsecond. A system of this type may be used in combination with framing cameras. Further, because of the relatively large aperture therein i.e. approximately 1″ square, the devices are particularly applicable in any area requiring a relatively high speed light valve.

Advantageously, a shutter or light valve according to the invention may be triggered by an event itself. For example, a flash of light may be used to trigger the valve or electronic means may be incorporated for that purpose.

Briefly, the present invention contemplates a high speed optical shutter comprising a substrate and an electrically conducting thin film deposited on the substrate. The electrically conducting thin film is operatively connected to means for producing a high voltage discharge. The electric discharge passing through the film destroys the reflectivity of the film to thereby change the condition of the shutter.

In some cases it is desirable to place the opaque or reflecting surface, i.e. the electrically conducting thin film and substrate in an inert gas. Helium has been found to be the most desirable of the inert gases, however, air is also a satisfactory atmosphere.

A second embodiment of the invention includes an intermediate layer of an ammonium halide. The ammonium halide is placed between the electrically conducting film and the substrate to obtain improved results.

A third embodiment of the invention includes two layers of an electrically conducting thin film such as aluminum and/or magnesium separated by a relatively thin intermediate dielectric film. The optical density of the film may be significantly increased without requiring a similar increase in voltage discharge for removing the film.

The invention will now be described in connection with the accompanying drawings; in which, FIG. 1 is a perspective view showing a shutter according to the first embodiment of the invention;

Figure 1:
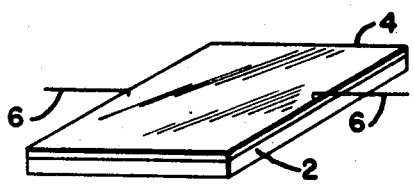
Figure 2:
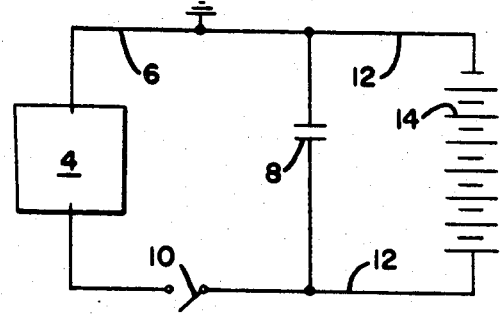
FIG. 2 is a schematic illustration of the first embodiment of the invention including means for opening or closing the shutter.

The first embodiment of the invention will be described in connection with FIGS. 1 and 2 wherein like reference numerals have been used to indicate similar parts. A substrate 2 preferably of glass has a relatively thin electrically conducting film 4 deposited thereon. The film 4 may consist of magnesium, aluminum, or alloys containing aluminum, magnesium or some other suitable material such as silver. Magnesium has been found to be satisfactory from a commercial standpoint.

The glass surface should be properly cleaned prior to deposition in order to insure that substantially all of the film will be removed during the opening or closing of the shutter.

The thin film 4 is connected by leads 6 in parallel with a capacitor 8 when a switch 10 is closed. The capacitor 8 is connected by the leads 12 to electrical means 14 for producing a high voltage electrical discharge of between 2000 and 10,000 volts. The capacitor 8 in one embodiment of the invention has a capacitance of between $\frac{1}{10}$ and two microfarads. The capacitor is charged by the high voltage supply 14 and discharges across the film 4 when the switch 10 is closed. The electric discharge passing through the film 4 destroys the film 4 to thereby open or close the shutter.

Figure 3:
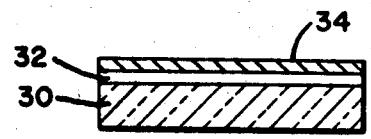
FIG. 3 is a cross sectional view illustrating a second embodiment of the invention.

A second embodiment of the invention shown in FIG. 3 includes an intermediate layer 32 of ammonium halide. The ammonium halide, preferably ammonium chloride may be applied by spinning techniques. For example, the ammonium chloride may be dissolved in a liquid, such as isopropyl-alcohol, and applied to a glass substrate 30. The substrate is placed in a high speed centrifuge and subsequently the solvent is removed by evaporation leaving the layer 32 of ammonium halide on the glass substrate 30. The substrate 30 having the film 32 thereon is placed in a vacuum chamber and a thin electrically conducting film 34 is deposited on top of the film 32. The ammonium halide film has been found to substantially improve the removal of the metal film by the electric discharge.

Figure 4:
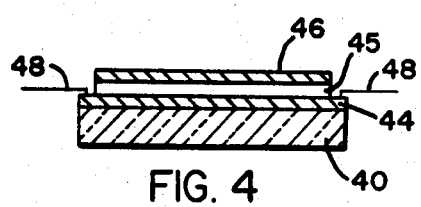
FIG. 4 is a cross sectional view illustrating a third embodiment of the present invention.

FIG. 4 illustrates a third embodiment of the invention. A glass substrate 40 has two relatively thin electrically conducting films 44 and 46 deposited thereon. A dielectric film 45 is deposited in between the deposition of the film 44 and the film 46. Separating the two films 44 and 46 by a relatively thin intermediate dielectric film 45 has been found to have superior characteristics for various applications. For example, the optical density of the film may be significantly increased without requiring a similar increase in voltage discharge for removing the film. Further, since a relatively smaller voltage discharge is required for removing the film, the flash emitted as the electrically conducting film is destroyed is less intense than the corresponding flash for removing a single layer of similar optical density. In the third embodiment of the invention the electric leads 48 are connected to the film 44. The film 46 is electrically insulated from the film 44 by the intermediate layer 45.

Figure 5:
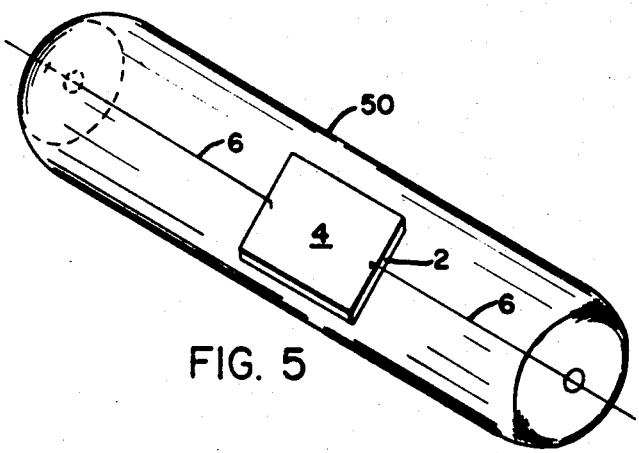
FIG. 5 is a perspective view illustrating a shutter according to the first embodiment of the invention disposed in an inert atmosphere.

A glass substrate 2 having a metal film 4 deposited thereon may be disposed in an inert gas as illustrated in FIG. 5. In FIG. 5 the film 4 is connected by the leads 6 to the outside of an envelope 50. The envelope 50 contains an inert gas. The leads 6 extend through the envelope 50. The leads 6 are connected to a capacitor and voltage supply (not shown) according to the schematic diagram shown in FIG. 2.

Figure 6:
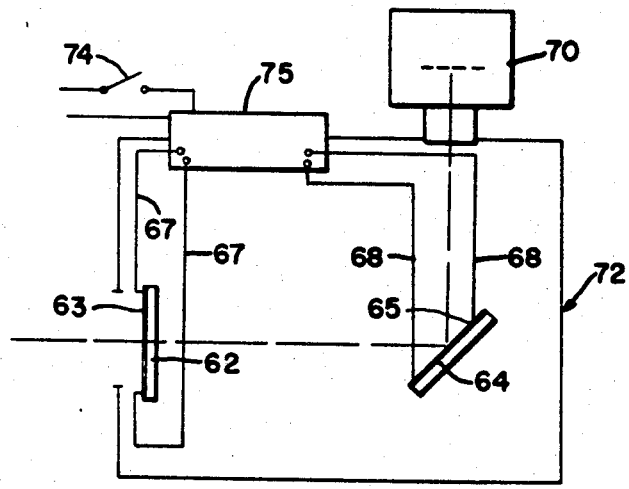
FIG. 6 is a schematic illustration showing two shutters according to the present invention arranged for opening and closing a camera.

A plurality of shutters or mirrors may be arranged according to the schematic diagram shown in FIG. 6. This arrangement is operable as a camera wherein means are provided for opening and closing a shutter at relatively high speeds. A high speed framing camera 70 is combined with the camera 72. The camera 72 includes a first shutter 62 for opening the camera and a second shutter 64 for closing the camera. The shutter 62 has an opaque coating 63 thereon which is destroyed by an electric discharge to open the camera. The shutter 64 has a reflective coating 65 thereon which directs the light rays into the high speed framing camera 70. The destruction of the coating 65 allows the light rays to pass through the shutter 64 to thereby effectively close the camera. The shutters 62 and 64 are connected to electrically responsive control means 75 by the leads 67 and 68 respectively. A switch 74 may be used to energize the control means 75. The control means 75 is effective to selectively produce a high voltage discharge across the coating 63 to thereby open the shutter. The control means 75 is also effective to selectively produce a high voltage discharge across the coating 65 to thereby close the shutter.

While several embodiments have been illustrated in the specification it will be understood these forms are shown for purposes of illustration. The illustrated forms may be modified and embodied in various other forms or employed in other uses without departing from the spirit or the scope of the appended claims.

What is claimed is:
1. An optical shutter comprising an electrically conducting reflective film consisting essentially of magnesium, and means for applying sufficient high voltage electrical energy across said film to remove the film and destroy the reflectivity of the optical shutter.

2. The optical shutter of claim 1 wherein an intermediate film of ammonium halide is interposed between the reflective film and a substrate.

3. The optical shutter of claim 1 wherein an intermediate dielectric film is interposed between the magnesium film and a second metal film.

4. An optical element comprising a substrate, an electrically conducting reflective metal film, an intermediate dielectric film comprising ammonium halide between the substrate and the metal film, and means for applying high voltage electrical energy across the metal film to change the reflectivity of the optical element.

5. The optical element of claim 4 wherein the dielectric film comprises ammonium chloride.

6. The optical element of claim 4 wherein the metal film comprises aluminum or magnesium.

No references cited.

JEWELL H. PEDERSEN, *Primary Examiner.*
W. L. SIKES, *Assistant Examiner.*